United States Patent [19]
Pettinger et al.

[11] 3,804,711
[45] Apr. 16, 1974

[54] NUCLEAR REACTOR

[75] Inventors: Donald Stanley Pettinger; Geoffrey Alfred Roberts, both of Knutsford, England

[73] Assignee: The Nuclear Power Group Limited, Knutsford, England

[22] Filed: Oct. 20, 1970

[21] Appl. No.: 82,298

[52] U.S. Cl. .................................. 176/84, 176/87
[51] Int. Cl. ....... G21c 5/08, G21c 5/02, G21c 5/16
[58] Field of Search............................ 176/84, 87, 85

[56] References Cited
UNITED STATES PATENTS
3,607,643   9/1971   Paget .................................... 176/84
3,218,236   11/1965  Tollet .................................. 176/84 X FOREIGN PATENTS OR APPLICATIONS
646,905   8/1962   Canada .............................. 176/85
693,079   8/1964   Canada .............................. 176/84

*Primary Examiner*—Carl D. Quarforth
*Assistant Examiner*—Roger S. Gaither
*Attorney, Agent, or Firm*—Holman and Stern

[57] ABSTRACT

A graphite core for a nuclear reactor comprising an assembly of graphite blocks arranged vertically in spaced columns, each block having means for maintaining it in alignment with adjacent blocks of its column, a layer of spacer blocks supported on top of the core with the individual spacer blocks aligned with the columns, a plurality of laterally displaceable wedges in each spacer block adapted to be displaced laterally to contact directly or indirectly the blocks of adjacent columns said wedges being disposed in at least one ring around the spacer block.

9 Claims, 5 Drawing Figures

NUCLEAR REACTOR

This invention relates to nuclear reactors having neutron moderator cores of graphite.

It is common practice to construct such cores as an assembly of graphite blocks arranged in spaced vertical columns within a constraining framework. In operation, the graphite blocks expand and shrink by varying amounts and in order to maintain the pitch of the centre lines of the columns substantially constant, various keying arrangements have been proposed which permit expansion and shrinkage whilst maintaining the aforesaid pitch substantially constant.

A more recent proposal is that the graphite blocks should be replaceable during the life of the reactor, in which case the use of keys can lead to difficulties.

According to the present invention a graphite core for a nuclear reactor comprises an assembly of graphite blocks arranged vertically in spaced columns with the individual blocks of a column maintained in vertical alignment and a layer of spacer blocks each axially located over a column and having a plurality of wedges adapted to be laterally displaced to engage directly or indirectly the blocks of adjacent columns, the wedges being disposed in at least one ring around the spacer block.

By arranging the spacer blocks to form the upper layer of the core, the spacing of the columns of blocks beneath them can be fixed within predetermined limits.

In accordance with one embodiment of the invention, the wedges may be located in a plurality of vertically spaced rings and each pair of wedge rings may be separated by a ring-shaped collar having wedge surfaces which engage the wedges, the collars being capable of limited movement in a vertical direction.

The spacer blocks may be of steel and form part of a radiation shield for the reactor core.

The invention also consists in a spacer block construction for a nuclear reactor core substantially as described herein with reference to the accompanying drawings, in which.

Figure 1:
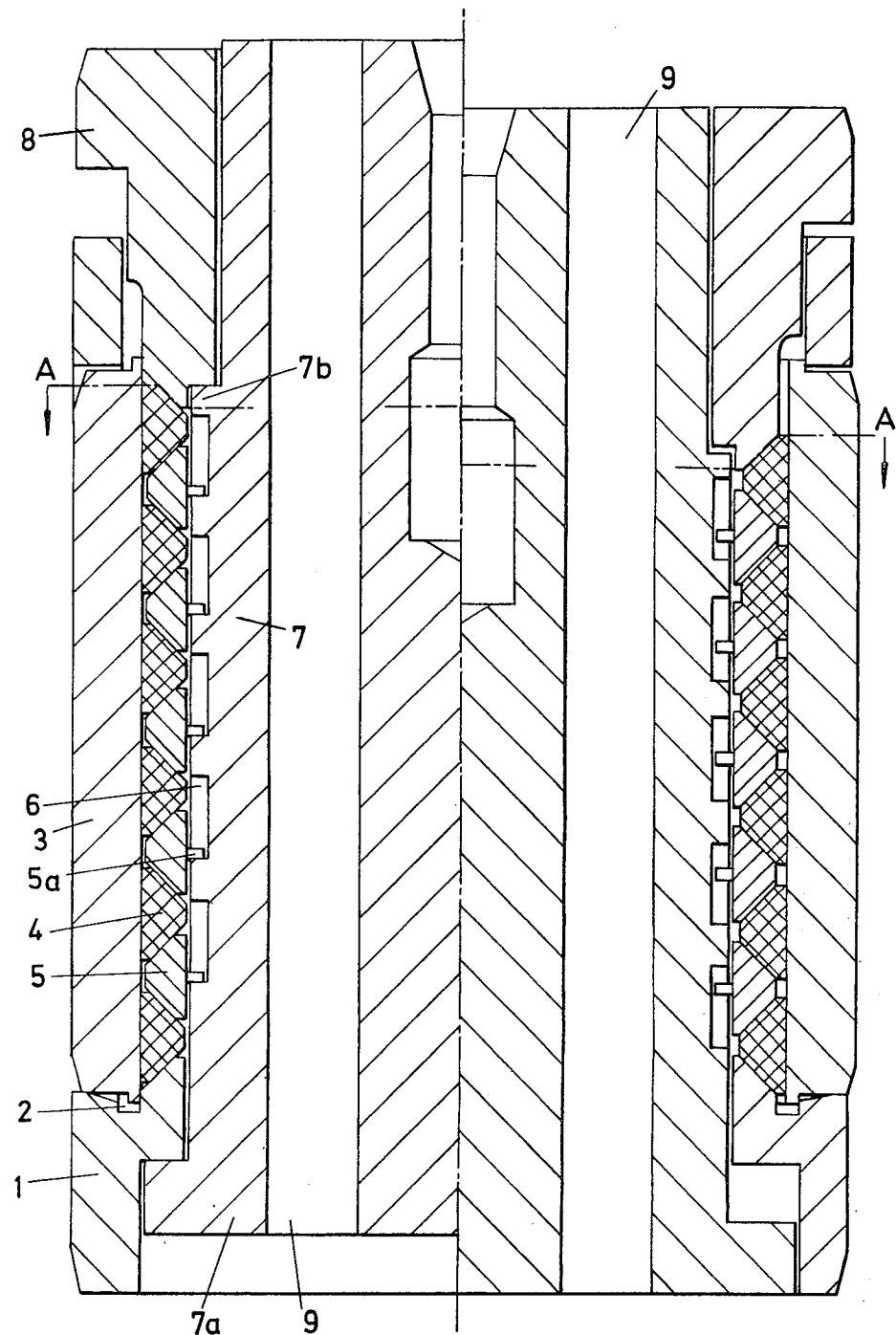
FIG. 1 is a longitudinal section through a spacer block in accordance with one embodiment of the invention, being a section on line BB of FIG. 2 which is a sectional plan on line AA of FIG. 1.
Figure 2:
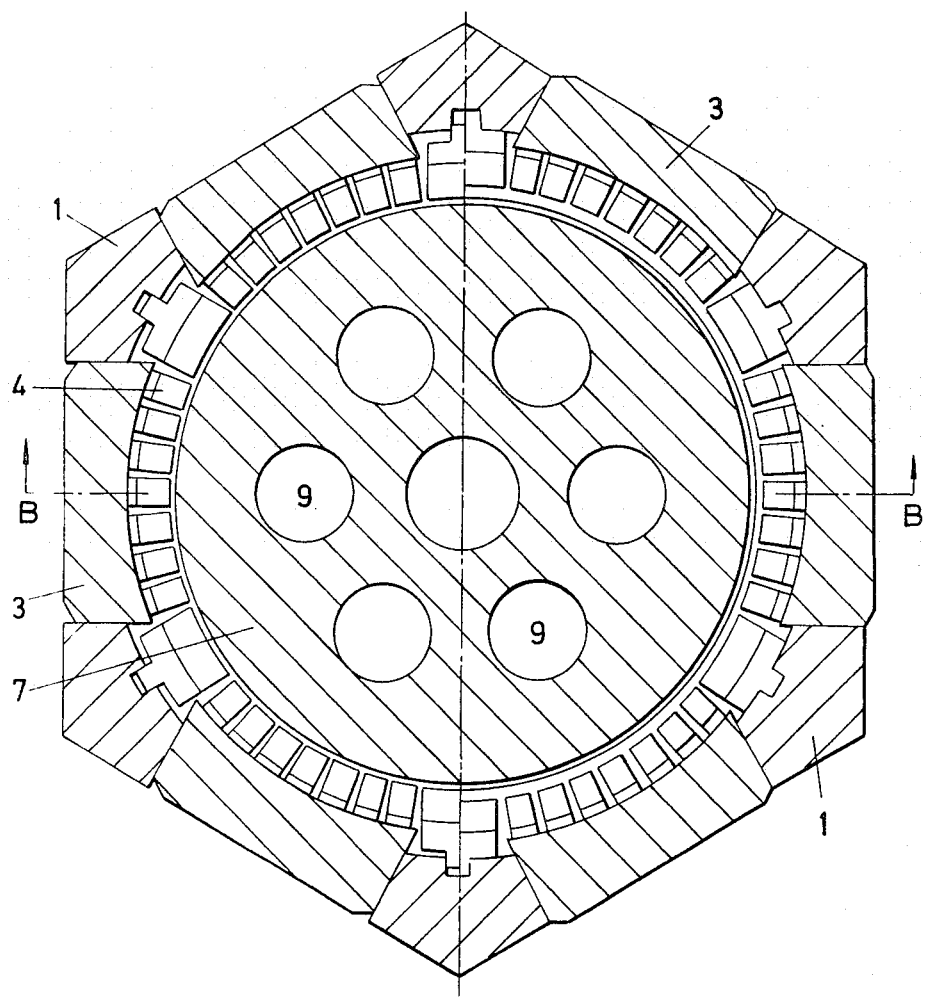

In carrying the invention into effect in the form illustrated by way of example, and referring to FIGS. 1 and 2, a spacer block for a nuclear reactor core comprises an outer sleeve 1 having a series of apertures 2 spaced around its periphery. Located in each aperture is a laterally displaceable member 3. Engaging the inner surface of each member 3 are a series of vertically spaced rings of wedges 4. As can be seen from FIG. 2 the wedges are relatively narrow.

Each ring of wedges is engaged by wedge surfaces of a ring-shaped collar 5. Each collar is a continuous ring and has six lifting pins 5a located in a longitudinal channel 6 in the outer surface of an inner sleeve 7.

The wedge and collar assembly supports a weight 8 which actuates the wedges.

In operation, the spacer block is lowered into position at the top of a column of graphite blocks in the reactor core, the block being supported by a grab attached to inner sleeve 7. In this position the outer sleeve 1 is supported on flange 7a of the inner sleeve and the weight 8 on flange 7b. The ring-shaped members 5 rest on the lower ledges of the channels 6 as shown on the left-hand side of FIG. 1. When the outer sleeve 1 contacts the uppermost block in the column it is brought to rest. At this instant the weight is still supported by the inner sleeve. As the grab lowers the inner sleeve further, the force due to the weight 8 is transferred to the wedge assembly and the graphite wedges are displaced laterally and in turn they act to displace laterally the members 3. Ultimately, the inner sleeve comes to rest on the uppermost block in the column in a position shown on the right-hand side of FIG. 1 which also shows the members 3 displaced.

To lift the block, a grab is again attached to the inner sleeve which moves upward until it lifts the weight 8. The wedges are then slackened by further upward movement and the members 3 can be displaced inwardly.

The spacer block contains gas passages 9 which when the block is in position in the core, are aligned with gas passages in the graphite blocks.

The various parts of the spacer block can be of graphite, but the weight 8 will in general be of steel. The block may form the upper layer of the graphite core and if all the parts are made of steel, it can form with other spacer blocks a radiation shield for the top of the core.

Figure 3:
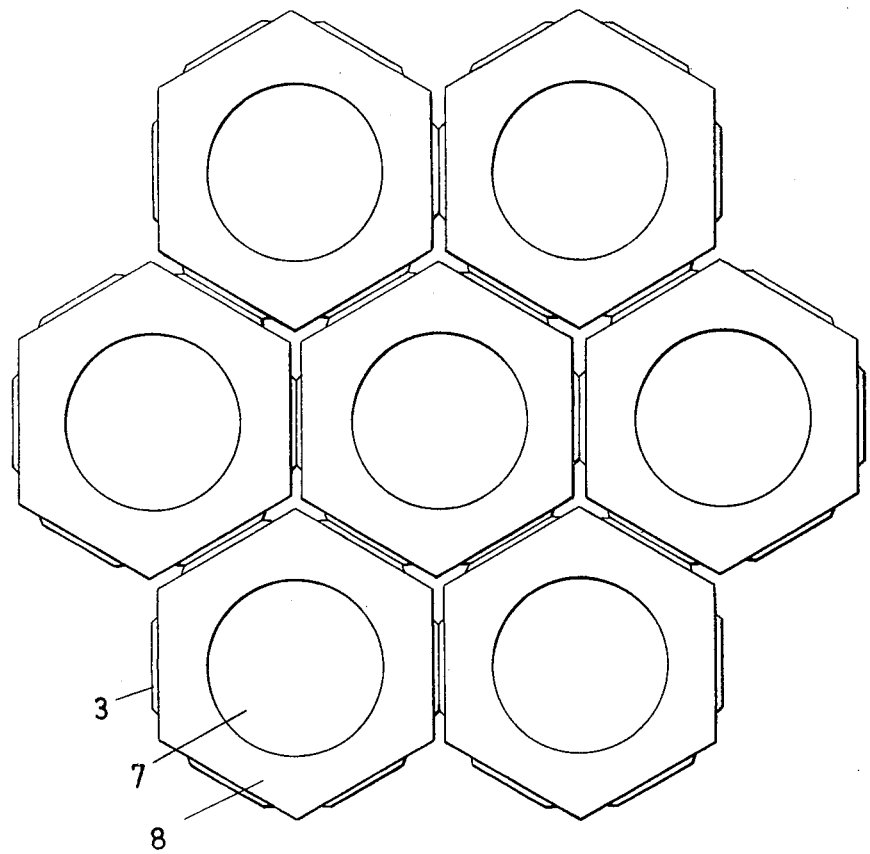
FIG. 3 is a plan view of a number of adjacent spacer blocks in position in a reactor core.

FIG. 3 shows a number of adjacent spacer blocks with their members 3 displaced so as to contact the displaceable members of adjacent blocks. Gas passages etc. have been omitted for the sake of clarity. Instead of the displaceable members of adjacent spacer blocks contacting each other, the displaceable members of one block may contact a side face of an adjacent block.

Initially the members 3 will be moved outwards by a distance equal to half the space between the blocks for the configuration of FIG. 3. Any load applied to one block due, say, to deflection of the graphite column beneath, is transmitted to all other spacer blocks and this avoids the concentration of these forces on a single block.

If the spacer blocks expand, the members 3 can be displaced inwards, the resultant movement being such as to lift the weights 8. As a result a constant force exists between blocks of adjacent columns and between the blocks and core constraining means at the periphery of the core.

As the arrangement is capable of accommodating thermal expansions within itself, it can be housed in fixed core constraining means as opposed to the more conventional flexible constraining means.

By arranging the spacer blocks in the manner described, and spigotting the blocks to the columns of graphite blocks forming the core, the spacer blocks maintain the correct column pitch throughout the core.

Whilst in the embodiment described the spacer blocks are located on the upper surface of the core, they could also be located within the body of the core to provide a seal barrier against the flow of gas between adjacent blocks. The term wedge as used herein is intended to include other elements such as balls and rollers.

Figure 4:
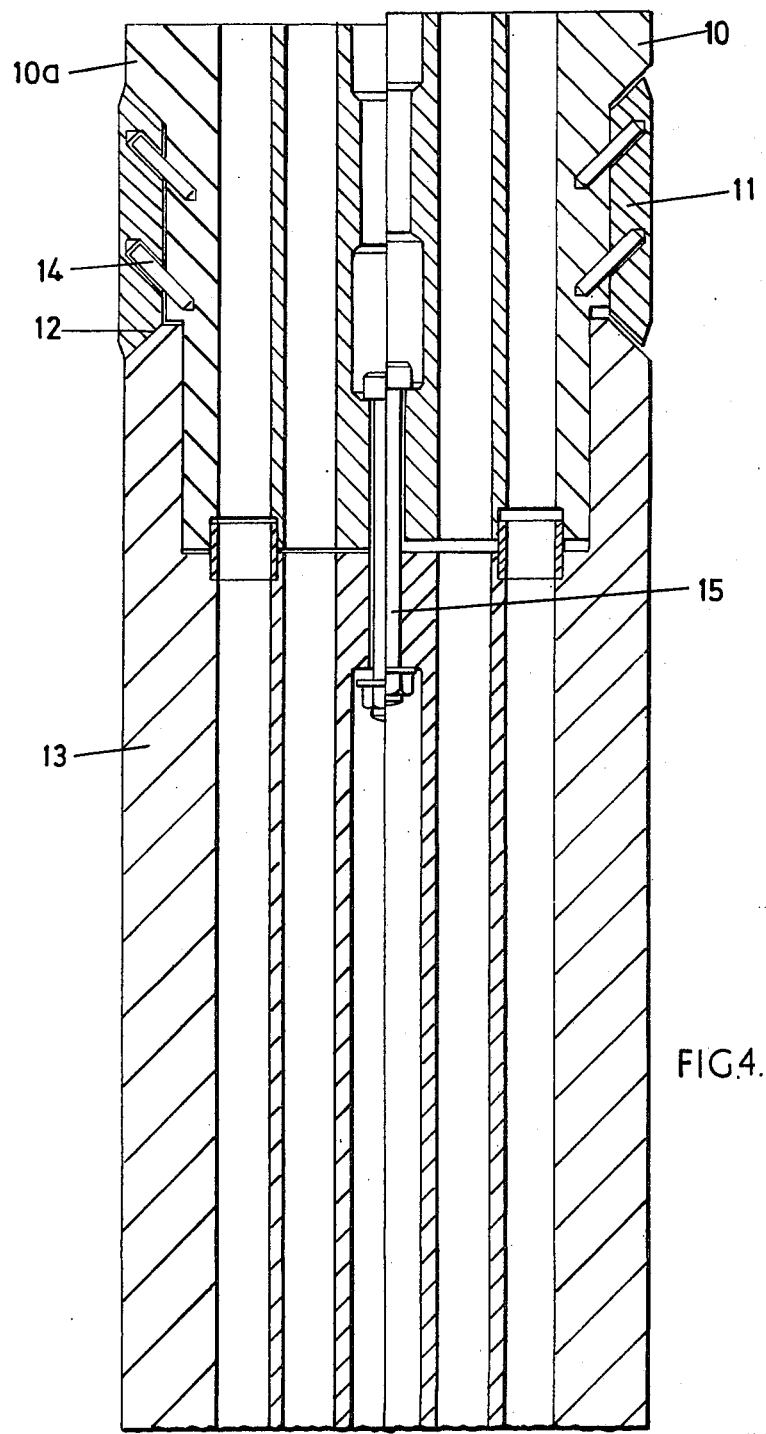
FIG. 4 shows a view, similar to that of FIG. 1, of an alternate embodiment of the invention.

In a further embodiment illustrated in FIG. 4 the spacer block indicated generally by the reference numeral 10 has a single ring of wedges 11 which contact at their lower ends a wedge shaped surface 12 of the uppermost block 13 of the column. The spacer block has a flange 10 on the underside of which has a wedge surface adapted to co-act with the wedges 11 as shown. Pins 14 serve to locate the wedges relative to the member 10. A shouldered bolt 15 ties the spacer block to the uppermost block 13 of the column. The wedges 11 are actuated in this instance by the weight of the spacer block itself. The left-hand side of FIG. 4 shows the spacer block in its operating position in the core with the wedges displaced laterally. The right-hand side shows the spacer block in a lifted position with the wedges retracted. As before the spacer blocks can be raised or lowered by means of a grab (not shown).

Figure 5:
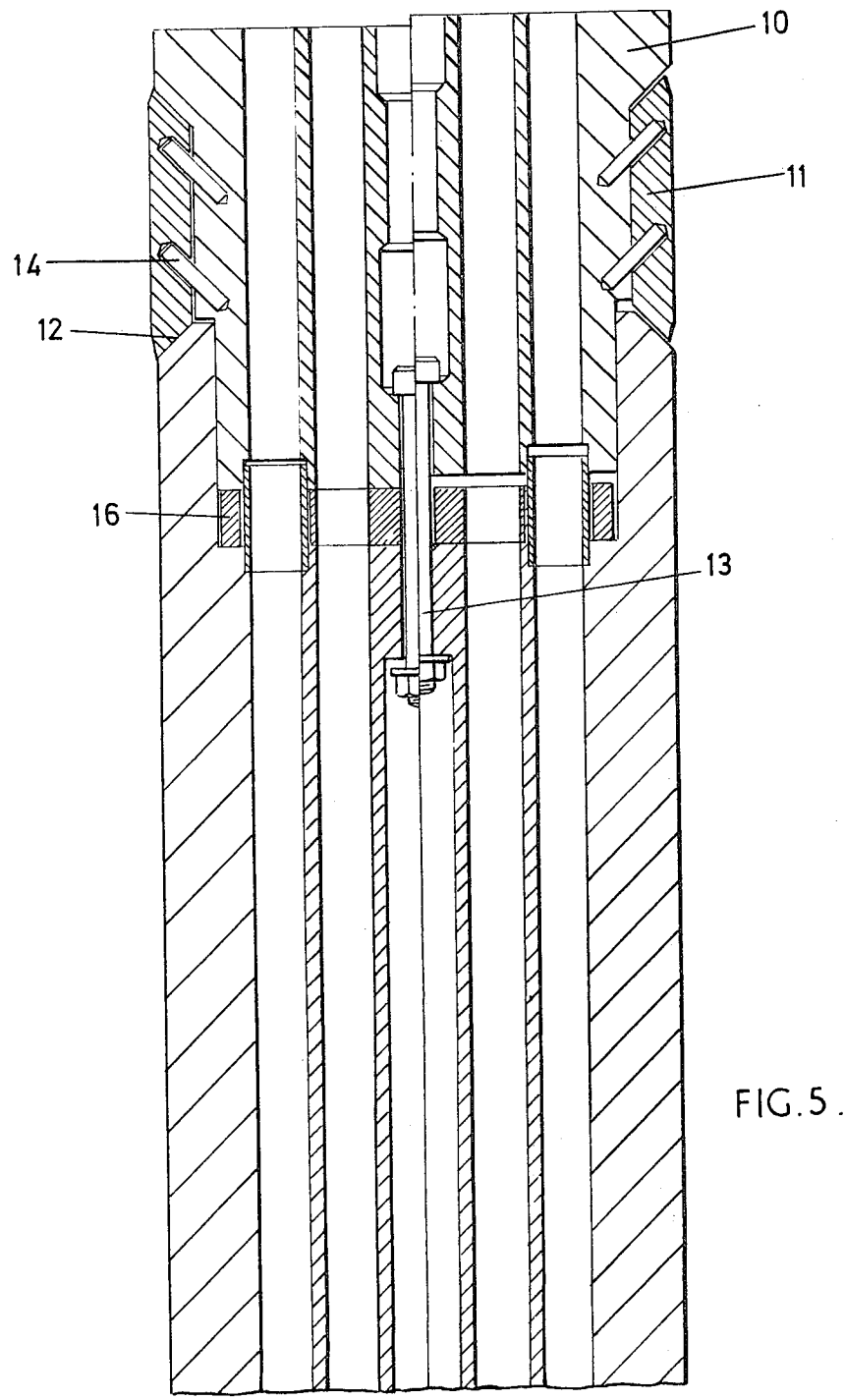
FIG. 5 is a view similar to FIG. 4 showing a metal ring insert.

In FIG. 5 the spacer block 10 is shown supported on a metal ring 16 interposed between the lower end of the blocks and the uppermost block 13 of the column. The dimensions of the ring and the material are shown so that the thermal expansion or contraction of the ring in the direction of the axis of the column are the same as or substantially the same as the thermal expansion or contraction of the wedges 11 in the same direction. By this means the wedges are not forced outwards by general thermal growth of the assembly.

We claim:

1. A graphite core for a nuclear reactor comprising an assembly of graphite blocks arranged vertically in spaced columns, each block having means for maintaining it in alignment with adjacent blocks of its column, a layer of spacer blocks supported on top of the core with the individual spacer blocks aligned with the columns, the individual spacer blocks having at least one ring of laterally displaceable body portions loosely retained on the outer face of the spacer blocks, said body portions being subject to a caming action by a corresponding wedge surface associated with the body of the spacer block to laterally displace said body portions into engagement with adjacent spacer blocks.

2. A graphite core as claimed in claim 1 in which the laterally displaceable body portions which further include laterally displaceable body members which contact the members and the spacer blocks of adjacent columns when said body portions are in engagement with adjacent spacer blocks.

3. A graphite core for a nuclear reactor as claimed in claim 1, comprising an assembly of graphite blocks arranged vertically in spaced columns, each block having means for maintaining it in alignment with adjacent blocks of its column in which the laterally displaceable body portions include a series of vertically spaced wedges disposed around the spacer block.

4. A graphite core as claimed in claim 3 wherein said corresponding wedge surface associated with the body of the spacer block comprises wedge shaped collars located between each pair of vertically spaced wedge rings, said collars being capable of limited movement in a vertical direction.

5. A graphite core as claimed in claim 3 wherein a weight is operatively supported by said vertically spaced wedges which causes them to be displaced laterally during said caming action.

6. A graphite core as claimed in claim 1 with spacer blocks of steel.

7. A graphite core as claimed in claim 1 with spacer blocks of graphite.

8. A graphite core for a nuclear reactor comprising an assembly of graphite blocks arranged vertically in spaced columns each block having means for maintaining it in alignment with adjacent blocks of its column, a layer of spacer blocks supported on top of the core with the individual spacer blocks aligned with the columns, a plurality of laterally displaceable wedges having upper and lower edges and disposed in a single ring around the periphery of each of said individual spacer blocks, a flange on the upper end of each of said individual spacer blocks said flange having a wedge shaped surface on its underside which engages the upper edges of said laterally displaceable wedges, and a wedge shaped surface on the uppermost block of the columns which engages the lower edges of said laterally displaceable wedges.

9. A graphite core as claimed in claim 8 comprising a metal ring separating the lower face of a spacer block and its associated column said ring being dimensioned so that the thermal strain of the ring in the direction of the axis of the column is substantially equal to the thermal expansion or contraction of the wedges in the same direction.

* * * * *